United States Patent [19]

Emkey

[11] Patent Number: 4,464,022

[45] Date of Patent: Aug. 7, 1984

[54] OPTICAL CIRCULATOR

[75] Inventor: William L. Emkey, Bethlehem, Pa.

[73] Assignee: AT&T Bell Laboratories, Murray Hill, N.J.

[21] Appl. No.: 425,693

[22] Filed: Sep. 28, 1982

[51] Int. Cl.³ .................................................. G02F 1/00
[52] U.S. Cl. ................................. 350/377; 350/96.15; 350/377; 350/403
[58] Field of Search ................ 350/375, 377, 401, 403, 350/286

[56] References Cited

U.S. PATENT DOCUMENTS

| 4,178,073 | 12/1979 | Uchida et al. | 350/151 |
| 4,239,329 | 12/1980 | Matsumoto | 350/96.15 |
| 4,272,159 | 6/1981 | Matsumoto | 350/375 |
| 4,359,268 | 11/1982 | Kondo | 350/377 |
| 4,392,722 | 7/1983 | Shirasaki | 350/375 |

FOREIGN PATENT DOCUMENTS 93120 7/1980 Japan ................................ 350/377

OTHER PUBLICATIONS

Electronics Letters, vol. 14, 1978, p. 816, "Compact Optical Circulator for Near-Infrared Region".
Electronics Letters, vol. 15, No. 25, Dec. 1979, pp. 830-831, "Simple Polarisation-Independent Optical Circulator for Optical Transmission Systems".
Applied Optics, vol. 20, No. 15, Aug. 1981, pp. 2683-2687, "Compact Polarization-Independent Optical Circulator".

Primary Examiner—John K. Corbin
Assistant Examiner—Lynn Vandenburgh
Attorney, Agent, or Firm—Lester H. Birnbaum

[57] ABSTRACT

A polarization independent optical circulator is disclosed. A first birefringent plate (10) is used to separate an incident beam from a first port into two beams having orthogonal polarizations, and a second plate (11) recombines the beams at a second port. Means (12) providing nonreciprocal rotation of the polarizations are disposed between the plates. Placed between the rotating means and the second plate is a third plate (16) to further separate the beams and a reflecting element (17) for deflecting the beams toward the second port. The reflecting element includes a slotted portion (18) so that light from a third port can pass therethrough back toward the first port.

8 Claims, 4 Drawing Figures

OPTICAL CIRCULATOR

BACKGROUND OF THE INVENTION

This invention relates to optical devices, and in particular to a polarization independent optical circulator.

With the growth of lightwave communications, the need for a variety of new optical devices has emerged. For example, multi-port optical circulators may be used to couple light between a transceiver (combination transmitter and receiver) and a bi-directional optical fiber. Early proposals for such circulators typically included a pair of prisms rotated 45 degrees with respect to each other about their optical axes and a Faraday rotator therebetween. The prisms determined the light path according to its direction of polarization and the rotator caused a 45 degree rotation of polarization so that light from one port would be incident on only one other port. (See, e.g., Electronics Letters, Vol. 14, page 816 (1978).) A basic problem with such circulators was that they were polarization dependent, i.e., they relied on an incident beam having linearly polarized light in a particular direction. Since optical fibers cannot generally preserve optical polarization, it was recognized that an efficient optical circulator should preferably be polarization independent.

Consequently, a variety of polarization independent circulators were proposed. Such devices basically include some means for splitting an incoming beam from one port into two beams having orthogonal polarizations, some means for recombining the two beams at another port, and means for nonreciprocal rotation of the polarization directions of the beams by odd or even multiples of 90 degrees depending upon the direction of the beams. This rotation means typically includes a Faraday rotator in combination with a half-wave plate. The means for splitting and recombining the beams and directing them through the rotator have generally included combinations of prisms which may be difficult to manufacture and align in the final structure and could produce significant insertion losses. (See, e.g., U.S. Pat. No. 4,272,159 issued to Matsumoto; Electronics Letters, Vol. 15, No. 25, pp. 830–831 (December 1979); and Applied Optics, Vol. 20, No. 15, pp. 2683-2687.).

It is known in the art of making optical isolators to utilize birefringent plates, rather than prisms, to separate and recombine beams having orthogonal polarizations. (See, e.g., U.S. Pat. No. 4,178,073 issued to Uchida et al and U.S. Pat. No. 4,239,329 issued to Matsumoto.) Such plates are easier to fabricate and align in the final device structure. However, their use in multi-port circulators has not been suggested previously to the best of my knowledge.

It is therefore an object of the invention to provide a multi-port optical circulator which is easy to fabricate and assemble and does not produce significant insertion losses.

SUMMARY OF THE INVENTION

This and other objects are achieved in accordance with the invention which is an optical circulator having at least three ports. The device comprises a first birefringent plate disposed at a first port in order to separate an incident light beam at that port into two beams having orthogonal directions of polarization, and a second birefringent plate disposed at a second port in order to recombine the two beams. Means are disposed between the plates for nonreciprocal rotation of the directions of polarization of the beams. A third birefringent plate is disposed between the rotation means and the second plate for further separating the two beams. A reflecting element is disposed between the third plate and second plate for deflecting the two beams toward the second port. The element includes a slot which permits passage therethrough of an incident beam from a third port.

BRIEF DESCRIPTION OF THE DRAWING

These and other features of the invention are delineated in detail in the following description. In the drawing.

Figure 1:
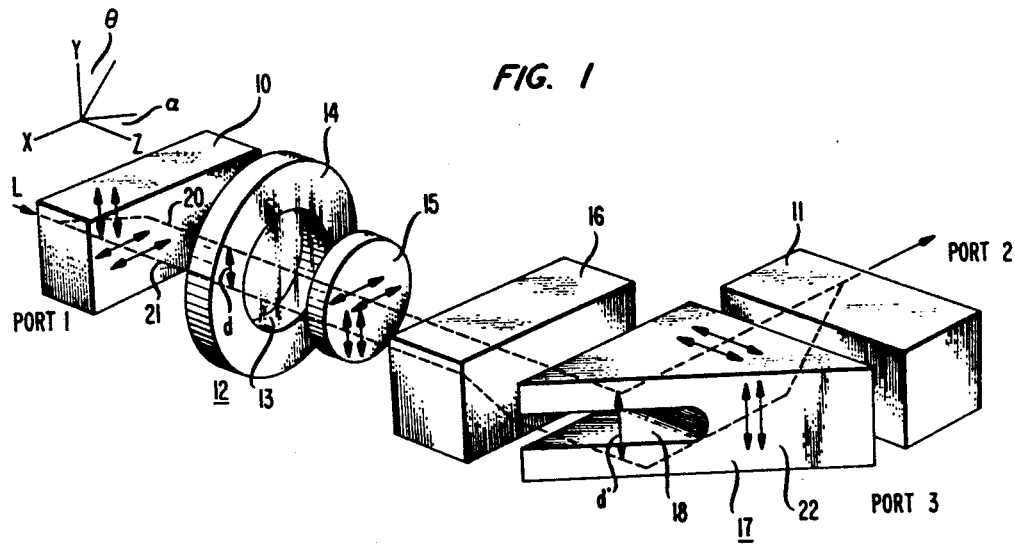
FIGS. 1–3 are perspective, partly schematic, views of a three port optical circulator in accordance with one embodiment of the invention illustrating light transmission between the ports.

It will be appreciated that for the purposes of illustration these figures are not necessarily drawn to scale.

DETAILED DESCRIPTION

The invention will now be described with reference to the embodiment shown in FIG. 1. A first birefringent plate, 10, is disposed so that a light beam, L, which is incident in the Z-direction at a port, designated here as port 1, will be incident on one face of the plate in the X-Y plane. The plate can be any birefringent material, but in this case was a piece of rutile measuring approximately 6.5 mm × 6.5 mm × 6.5 mm which was fabricated by standard techniques. A second birefringent plate, 11, identical to the first plate except that it had twice the thickness, was placed in front of another port, designated port 2. (The outside casing of the device is not shown for the sake of clarity. It will be understood that a "port" generally constitutes simply a window or other means for introducing and withdrawing light from the device.) Means, 12, for providing nonreciprocal rotation of the direction of polarization of incident beams is disposed between the plates. (It will be noted that the position of the elements is described in terms of the light path of an incident beam as described in more detail below. Consequently, the rotation means are situated between the plates even though plate 11 is not colinear with plate 10 and the rotation means are on line with plate 10). In this example, the rotation means included a Faraday rotator comprising a crystal, 13, of Yttrium Iron Garnet (YIG) with a permanent magnet, 14, surrounding the crystal. The means further included a quartz half-wave plate, 15. The YIG crystal measured approximately 5.0 mm in diameter and was approximately 2.1 mm thick, while the half-wave plate measured approximately 6.4 mm in diameter with a length of 75.6 mm. A third birefringent plate, 16, was disposed between the rotating means, 12, and the second plate 11. This plate was essentially identical to the first plate 10. Between this third plate and the second plate was a reflecting element, in this case a prism, 17, which was positioned to deflect light incident from port 1 away from port 3, which is on line with port 1, and toward port 2. The prism also included a slotted portion, 18, extending completely through two of its surfaces to permit passage of light therethrough for the reasons to be described. In this example, the prism was a standard 45 degree glass prism with its two 90 degree surfaces facing the second and third plates and its third surface at 45 degrees to the other surfaces facing the port designated port 3.

In operation, as illustrated in FIG. 1, light L is incident from port 1 onto one face of the first plate 10. It is assumed that the light is unpolarized. The plate 10 is oriented with its optical axis in a plane making an angle, α, with the X-Z plane so that the beam is split into two essentially parallel beams in the Y-Z plane which are linearly polarized. In this example, which was designed for 1.3 μm light, the angle, α, was approximately +48 degrees. One beam, 20, known in the art as the extraordinary ray, has its polarization in an essentially vertical direction in the Y-Z plane while the other beam, 21, known as the ordinary ray, has its polarization in the horizontal direction in the X-Z plane. The ordinary ray retains the direction of the incident beam while the extraordinary ray is deflected an amount d in the Y-direction. The displacement d is dependent upon the value of α and the thickness of the plate. In this example, the deflection was approximately 0.65 mm.

When the beams pass through the Faraday rotator, their directions of polarization are rotated approximately 45 degrees in the clockwise direction as viewed from port 1. The half-wave plate, by virtue of the fact that its optic axis is at an angle $\theta$ of 22.5 degrees to the projection of the optic axis of plate 10 onto the X-Y plane further rotates the directions of polarization 45 degrees in the clockwise direction so that the direction of polarization of beam 20 is now horizontal and that of beam 21 is now vertical. Although in this example a single 90 degree rotation is described, the invention is equally applicable if the rotating means is chosen to produce a rotation of any odd multiple of 90 degrees for light traveling in this direction.

Both beams are then incident on plate, 16, which has its optical axis at an angle so as to allow beam 20 to pass through essentially unaffected, but which produces a deflection of beam 21 which keeps the rays parallel but further displaces the beams. In this example, the new displacement, d', was approximately 1.30 mm and the angle that the optical axis makes with X-Z plane was −48 degrees (i.e., plate 16 was rotated 180 degrees about the Z-axis with respect to plate 10).

The displaced beams are then incident on prism 17 and are reflected by the surface, 22. It will be noted that plate 16 displaces the beams sufficiently so that beam 20 is incident on the surface above the slotted portion and beam 21 is incident below the slotted portion. The prism thereby deflects the two beams away from port 3 and toward the second birefringent plate 11. In this example, the deflection was 90 degrees, but other deflection angles may be chosen.

The second birefringent plate has an orientation and thickness so that the two beams are recombined and a single beam emerges at port 2. In this example, the plane of the optic axis was again at an angle of 48 degrees with respect to the X-Z plane in the direction of the light, but here the plane edge intersects the Z axis rather than the X-axis as before (i.e., plate 11 is rotated 90 degrees about the Y-axis with respect to plates 10 and 16). The plate thickness was approximately 13.0 mm. Thus, coupling from port 1 to port 2 is completed.

Figure 2:
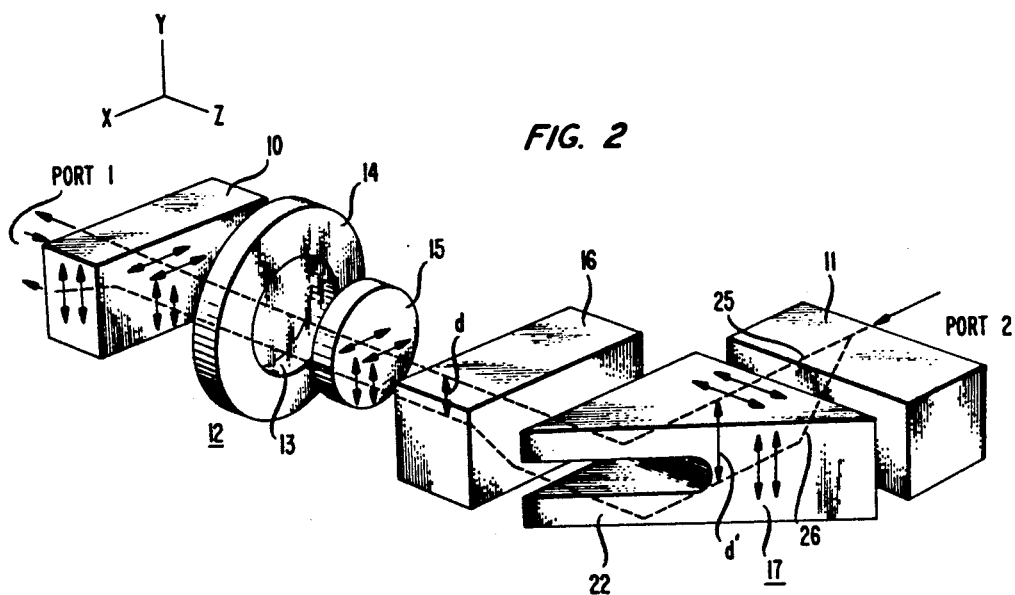

Coupling from port 2 to port 1 will be prevented as illustrated in FIG. 2 which shows the same device but with a schematic illustration of what happens when a light beam is incident from port 2. In this case, the light will be displaced into beams 25 and 26 having orthogonal polarizations by plate 11 with a distance of d' between the beams (d'=2d). The beams will again be reflected by the prism and in this direction, the two beams will be brought closer together by plate 16 (to a distance, d). The half-wave plate will rotate both polarizations by 45 degrees in the counterclockwise direction (as viewed from port 1). Since the rotation of the YIG is nonreciprocal, the directions of polarization of light coming from port 2 are then rotated back in the clockwise direction by 45 degrees (as viewed from port 1) so that no net rotation occurs. The top ray, 25, by virtue of its horizontal polarization, passes through the plate 10 without deflection and misses the port 1. The other beam, 26, which was on line with port 1 is deflected downward in plate 10 by virtue of its vertical polarization. Hence, both beams miss the port and light from port 2 is isolated from port 1.

Figure 3:
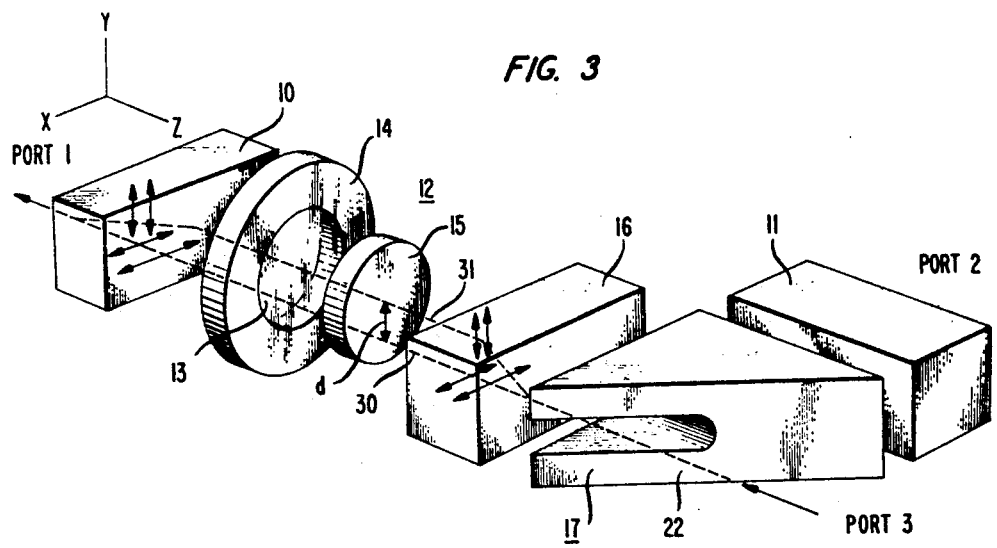

On the other hand, light from port 3 will be coupled to port 1 as illustrated in FIG. 3, which is again the same device as FIG. 1 but with a schematic illustration of what takes place when light is incident from port 3. It will be noted that the light from port 3 passes undisturbed through the slotted portion 18 of the prism 17. The beam is split by plate 16 into two parallel beams with the ordinary ray, 30, being polarized in the horizontal direction and the extraordinary ray, 31, which is deflected by an amount d, being polarized in the vertical direction. As in the case of light from port 2, the beam from port 3 will emerge from the rotation means 12 with no net rotation of the directions of polarizations. Here, however, the horizontally polarized beam enters the plate 10 on line with port 1 and the vertically polarized beam is situated above it. (This is the reverse of the case for light incident from port 2.) The orientation of plate 10 is such that the vertically polarized beam will be deflected downward and the horizontally polarized beam will be undeviated so that the two rays combine and will be incident on port 1. Thus, coupling of light from port 3 to port 1 is realized with no significant interference from light incident or reflected from port 2.

In this particular example, the insertion loss in coupling from port 1 to port 2 was −2.5 dB, and the insertion loss from port 3 to port 1 was −2.0 dB. Isolation for light reflected back from port 1 to port 3 was −25 dB. Crosstalk from port 3 to port 2 was −35 dB. The device, therefore, is effective in coupling to a bidirectional line where the input-output fiber is coupled to port 1, the receiver is coupled to port 2 and the transmitter is coupled to port 3.

Figure 4:
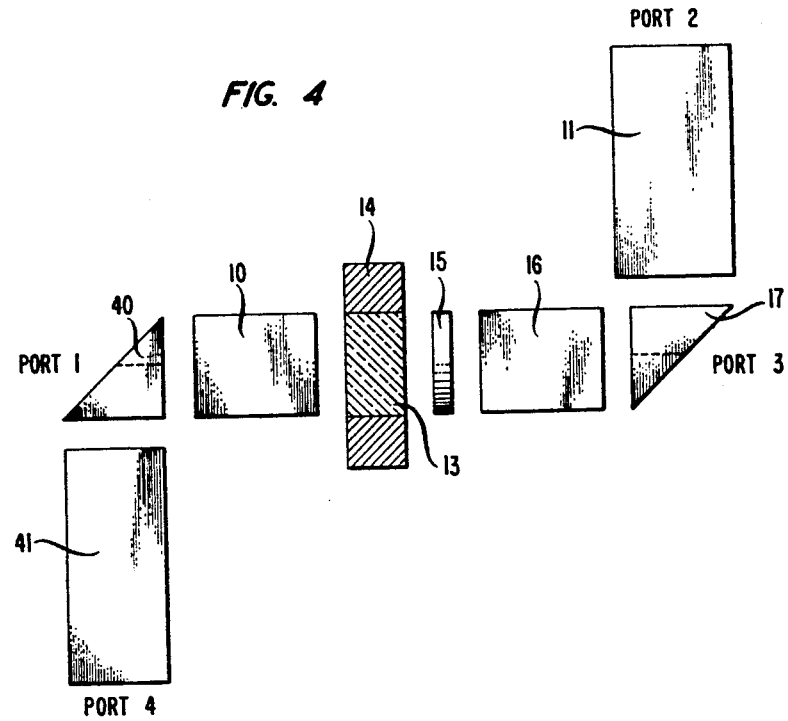
FIG. 4 is a plan view of a four port coupler in accordance with a further embodiment of the invention.

The invention therefore provides a relatively simple means of achieving three port coupling. If desired, four port coupling can also be provided with additional elements as shown in FIG. 4. This Figure is a plan view of a four port coupler with elements similar to those of FIGS. 1-3 being similarly numbered. (The rotator is shown in cross-section to reveal the YIG crystal.) The additional components are a second reflecting element such as a prism, 40, disposed between port 1 and the birefringent plate, 10, and a fourth birefringent plate, 41, which is identical to the plate 11, disposed between one face of the prism and port 4. Although not apparent in this view, prism 40 is slotted in the same way as prism 17 to permit light incident from port 1 or port 3 to pass therethrough while light beams from port 2 are deflected to plate 41 where they recombine and are incident on port 4. Similarly, separated beams from port 4 will be deflected by prism 40 to be ultimately incident on port 3.

Thus, the circulator of FIG. 4 couples light from port 1 to port 2, from port 2 to port 4, from port 4 to port 3, and from port 3 to port 1. In view of the previous discussion of the three port circulator, a detailed discussion of the operation of this embodiment is not necessary.

Although the invention has been described in terms of an embodiment which causes a 90 degree rotation of polarization as light travels from left to right and no rotation as light travels from right to left, it should be appreciated that the reverse case can also be employed by reversing the magnetic field on the rotator (i.e., no rotation from left to right and 90 degree rotation from right to left). In such an embodiment, for example, the orientation of plates 10 and 16 could be identical, while port 3 and the slotted portion 18 would be offset from port 1 in the Y-direction by an amount, d. All that is required in these circulators is that there be a nonreciprocal rotation of polarization in the forward and reverse directions.

Various additional modifications of the invention as described will become apparent to those skilled in the art. All such variations which basically rely on the teachings through which the invention has advanced the art are properly considered within the spirit and scope of the invention.

What is claimed is:

1. An optical circulator having at least three ports comprising:
   a first birefringent plate disposed at a first port in order to separate an incident light beam at that port into two beams having orthogonal directions of polarization;
   a second birefringent plate disposed at a second port in order to recombine the two beams;
   means disposed between the plates for nonreciprocal rotation of the directions of polarization of the beams;
   a third birefringent plate disposed between the rotation means and the second plate for further separating the two beams; and
   a reflecting element disposed between the third plate and second plate for deflecting the two beams toward the second port, the said element having a slot which permits passage therethrough of an incident beam from a third port.

2. The device according to claim 1 wherein the means for nonreciprocal rotation comprises a Faraday rotator and a half-wave plate.

3. The device according to claim 1 wherein the thickness of the second plate is approximately twice the thickness of the first plate.

4. The device according to claim 1 wherein the reflecting element comprises a prism having two surfaces at ninety degrees and a third surface at forty-five degrees to the other two surfaces, and the slotted portion is formed through one of the two surfaces and the third surface.

5. The device according to claim 1 wherein the circulator includes at least four ports and further comprises: a second reflecting element with a slotted portion disposed between the first port and the first plate; and a fourth birefringent plate disposed between the reflecting element and the fourth port.

6. The device according to claim 1 wherein the birefringent plates comprise rutile, and the rotation means includes a Faraday rotator comprising an yttrium iron garnet crystal and a half-wave plate comprising quartz.

7. The device according to claim 1 wherein the birefringent plates each have optical axes in a plane at an angle of ±48 degrees with respect to the horizontal in the direction of light incident from port 1.

8. An optical circulator having at least three ports comprising:
   a first rectangular birefringent plate disposed at a first port and oriented in order to separate a light beam incident at that port into two beams having orthogonal directions of polarization;
   a second rectangular birefringent plate having a thickness greater than said first plate and disposed at a second port with an orientation so as to recombine the two beams;
   means disposed between the plates for nonreciprocal rotation of the directions of polarization of the beams comprising a Faraday rotator and a half-wave plate;
   a third rectangular birefringent plate disposed between the rotation means and the second plate and oriented in order to further separate the two beams; and
   a prism having two surfaces at right angles, each of which is adjacent to one of the second and third plates, and a third surface at forty-five degrees to the other two surfaces, which third surface is adjacent to a third port, said third surface and the surface adjacent to said third plate having a slotted portion formed therethrough so that the beams from the third plate are deflected by said third surface while light incident from the third port passes through the slotted portion.

* * * * *